C. O. HANSEN.
FRICTION CLUTCH.
APPLICATION FILED FEB. 9, 1920.
1,373,810.
Patented Apr. 5, 1921.
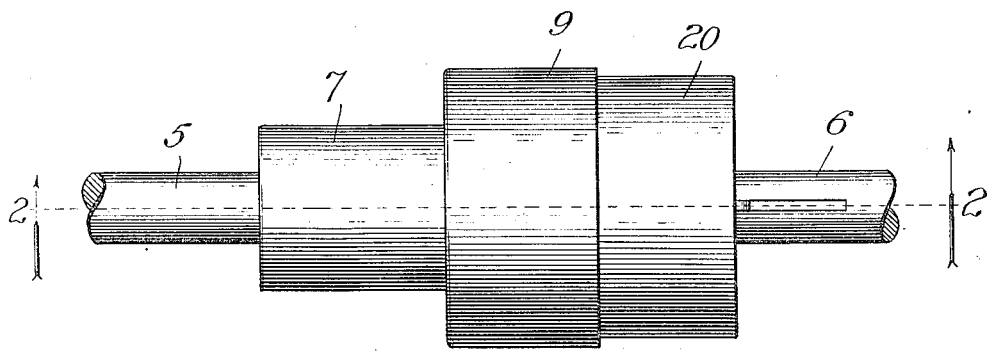
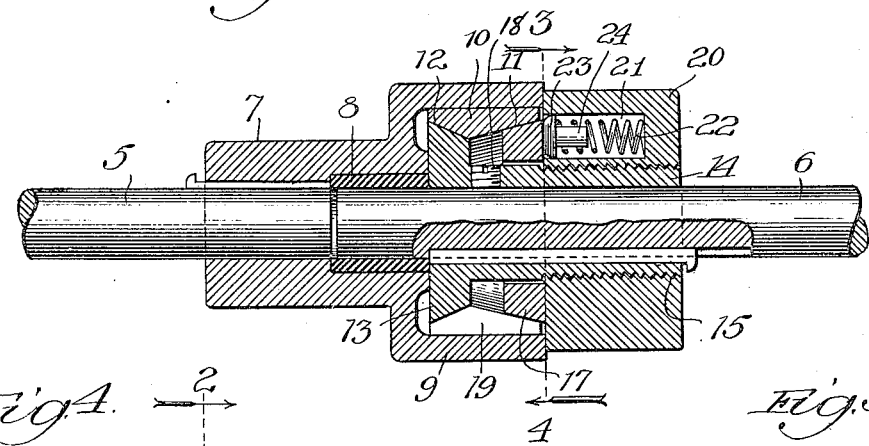
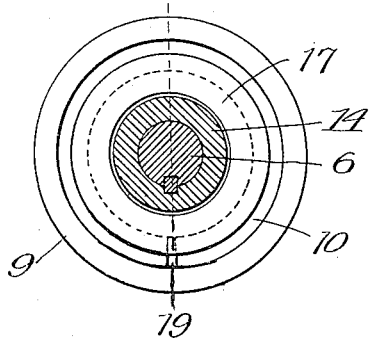
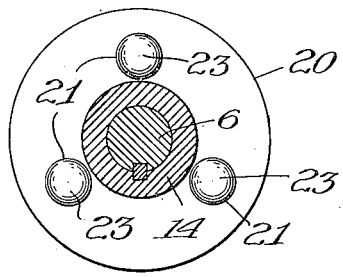
Inventor:
Clifford O. Hansen

UNITED STATES PATENT OFFICE.

CLIFFORD O. HANSEN, OF TIFFIN, OHIO.

FRICTION-CLUTCH.

1,373,810. Specification of Letters Patent. Patented Apr. 5, 1921.

Application filed February 9, 1920. Serial No. 357,383.

*To all whom it may concern:*

Be it known that I, CLIFFORD O. HANSEN, a citizen of the United States, residing at Tiffin, in the county of Seneca and State of Ohio, have invented a new and useful Improvement in Friction-Clutches, of which the following is a specification.

This invention relates to friction-clutches and is in the nature of an improvement on the type of friction-clutch of my Patent No. 1,338,298, dated April 27, 1920, to better adapt the latter for light work by rendering it a "slip" clutch.

In the accompanying drawing, Figure 1 is a view in elevation of the improved clutch showing it in its full operative dimensions as now manufactured; Fig. 2 is a section on line 2—2, Fig. 1, and Figs. 3 and 4 are sections on line 3—4, Fig. 2, and respectively viewed as indicated by arrows.

The clutch is shown applied to a driveshaft 5 and a driven shaft 6. On the driveshaft is keyed a sleeve 7 to extend about the driven shaft, where it is surrounded by a suitable bushing 8; and the sleeve terminates in a hollow cylindrical head 9 containing a split ring 10, of spring steel, forming the outer expansible clutch-member having the inner circumferential beveled surfaces 11 and 12 converging V-like in cross-section toward the center of the ring. An inner annular clutch-member 13 has a sleeve 14 keyed to the driven shaft 6 and conforms about its periphery to the ring-surface 12 to operate wedgingly against the latter; and the sleeve 14 is externally threaded as shown at 15. A companion annular clutch-member 17 surrounds the inner unthreaded section of the sleeve 14, on which it is longitudinally movable; and its periphery conforms to the ring-surface 11. A set-screw is represented at 18 for securing the sleeve 14 against longitudinal movement on the driven shaft. Each clutch-member 13 and 17 contains a transverse groove in its beveled face and a key 19 projects into these grooves and between the ends of the split expansion-ring to insure rotation of the latter with the adjacent clutch-members.

A nut 20 is screwed on the driven shaft adjacent the head 9. In the inner face of this nut are provided recesses 21, of which three are shown equidistant apart. In each recess a helical spring 22 is confined to bear at a button 23 against the outer face of the clutch-member 17, the button being on a short stem 24 extending into the inner end of the spring. These springs tend to wedge the clutch-members 13 and 17 resiliently against the ring 10 and thereby maintain the clutch in normal shipped condition for light work, but yieldingly for unshipping the clutch whenever the driven shaft becomes overloaded.

Any wear between the engaging surfaces of the nut-buttons and the wedge-member 17 may be readily compensated for by adjusting the nut toward that member.

I realize that considerable variation is possible in the details of construction, thus specifically shown and described, and I do not intend by illustrating a single specific or preferred embodiment of my invention to be limited thereto, my intention being, in the following claims, to claim protection upon all the novelty there may be in my invention as broadly as the state of the art will permit.

I claim:

1. In a friction-clutch, the combination of a sleeve having a hollow cylindrical head, an expansion-ring in said head having a straight outer surface adapted to bear against the interior of said head and having its inner surface beveled to converge toward its circumferential center, clutch-members within said ring provided with beveled peripheral surfaces to engage, respectively, said beveled ring-surfaces, a nut provided with recesses in its inner face, and springs in the nut-recesses to bear against the outer of said clutch-members and hold the clutch yieldingly in normally shipped condition.

2. In a friction-clutch, the combination of a sleeve having a hollow cylindrical head, an expansion-ring in said head having a straight outer surface adapted to bear against the interior of said head and having its inner surface beveled to converge toward its circumferential center, clutch members within said ring provided with beveled peripheral surfaces to engage, respectively, said beveled ring-surfaces, a nut adjustably mounted relatively to said head and provided with recesses in its inner face, and helical springs in the nut-recesses to bear against the outer of said clutch-members and hold the clutch yieldingly in normally shipped condition.

CLIFFORD O. HANSEN.